(12) United States Patent
Yano et al.

(10) Patent No.: US 11,230,756 B2
(45) Date of Patent: *Jan. 25, 2022

(54) FERRITIC STAINLESS STEEL

(71) Applicant: JFE Steel Corporation, Tokyo (JP)

(72) Inventors: Takayoshi Yano, Tokyo (JP); Kunio Fukuda, Tokyo (JP); Shin Ishikawa, Tokyo (JP); Katsuhisa Yamauchi, Tokyo (JP); Reiko Sugihara, Tokyo (JP); Hideya Matsumoto, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 32 days.

This patent is subject to a terminal disclaimer.

(21) Appl. No.: 16/325,575

(22) PCT Filed: Aug. 25, 2017

(86) PCT No.: PCT/JP2017/030438
§ 371 (c)(1),
(2) Date: Feb. 14, 2019

(87) PCT Pub. No.: WO2018/043309
PCT Pub. Date: Mar. 8, 2018

(65) Prior Publication Data
US 2019/0177825 A1 Jun. 13, 2019

(30) Foreign Application Priority Data
Sep. 2, 2016 (JP) .............................. JP2016-171519

(51) Int. Cl.
| | |
|---|---|
| *C22C 38/60* | (2006.01) |
| *C22C 38/02* | (2006.01) |
| *C22C 38/04* | (2006.01) |
| *C22C 38/06* | (2006.01) |
| *C22C 38/00* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/52* | (2006.01) |
| *C22C 38/50* | (2006.01) |
| *C22C 38/54* | (2006.01) |
| *C21D 9/46* | (2006.01) |
| *B23K 1/00* | (2006.01) |
| *B23K 1/19* | (2006.01) |
| *C21D 8/02* | (2006.01) |
| *C21D 6/00* | (2006.01) |
| *B23K 101/14* | (2006.01) |
| *B23K 35/30* | (2006.01) |

(52) U.S. Cl.
CPC ................ *C22C 38/60* (2013.01); *B23K 1/00* (2013.01); *B23K 1/19* (2013.01); *C21D 6/004* (2013.01); *C21D 8/0205* (2013.01); *C21D 8/0226* (2013.01); *C21D 8/0236* (2013.01); *C21D 9/46* (2013.01); *C22C 38/00* (2013.01); *C22C 38/001* (2013.01); *C22C 38/002* (2013.01); *C22C 38/004* (2013.01); *C22C 38/005* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *B23K 35/3086* (2013.01); *B23K 2101/14* (2018.08); *Y02P 70/10* (2015.11)

(58) Field of Classification Search
None
See application file for complete search history.

(56) References Cited

U.S. PATENT DOCUMENTS

| | | |
|---|---|---|
| 5,302,214 A | 4/1994 | Uematsu et al. |
| 6,645,318 B2 | 11/2003 | Takahashi et al. |
| 7,341,690 B2 | 3/2008 | Miyazaki et al. |
| 7,806,993 B2 | 10/2010 | Miyazaki et al. |
| 9,157,137 B2 | 10/2015 | Nakamura et al. |

(Continued)

FOREIGN PATENT DOCUMENTS

| | | |
|---|---|---|
| CN | 104364404 A | 2/2015 |
| CN | 105008590 A | 10/2015 |

(Continued)

OTHER PUBLICATIONS

Extended European Search Report for European Application No. 17846314.7, dated Aug. 5, 2019, 10 pages.

(Continued)

*Primary Examiner* — Anthony M Liang
(74) *Attorney, Agent, or Firm* — RatnerPrestia

(57) ABSTRACT

Provided is a ferritic stainless steel that has good corrosion resistance and which exhibits good brazeability when subjected to high-temperature brazing with a Ni-containing brazing filler metal.

The ferritic stainless steel has a composition containing, in mass %, C: 0.003 to 0.020%, Si: 0.05 to 0.60%, Mn: 0.05 to 0.50%, P: 0.04% or less, S: 0.02% or less, Cr: 17.0 to 24.0%, Ni: 0.20 to 0.80%, Cu: 0.01 to 0.80%, Mo: 0.01 to 2.50%, Al: 0.001 to 0.015%, Nb: 0.25 to 0.60%, and N: 0.020% or less, with the balance being Fe and incidental impurities, the composition satisfying formula (1) below and formula (2) below, $$Cu+Mo \geq 0.30 \quad (1)$$

$$4Ni-(Si+Mn) \geq 0 \quad (2)$$

(wherein Cu and Mo in formula (1) and Ni, Si, and Mn in formula (2) each represent the content (mass %) of the corresponding element).

22 Claims, No Drawings

(56) References Cited

U.S. PATENT DOCUMENTS

| | | | |
|---|---|---|---|
| 9,586,293 | B2 | 3/2017 | Wada et al. |
| 9,587,297 | B2* | 3/2017 | Ishii .................. C23G 1/086 |
| 9,932,650 | B2 | 4/2018 | Oku et al. |
| 10,272,513 | B2* | 4/2019 | Hirasawa ............... C22C 38/00 |
| 10,450,625 | B2* | 10/2019 | Fukuda ............... C21D 8/0278 |
| 10,458,013 | B2* | 10/2019 | Fukuda ............... C22C 38/44 |
| 2002/0012602 | A1 | 1/2002 | Takahashi et al. |
| 2008/0057357 | A1 | 3/2008 | Uchiyama et al. |
| 2011/0176953 | A1 | 7/2011 | Hiraide et al. |
| 2011/0290383 | A1 | 12/2011 | Yoshida et al. |
| 2013/0129560 | A1 | 5/2013 | Matsuhashi et al. |
| 2014/0069619 | A1 | 3/2014 | Hiraide et al. |
| 2015/0139851 | A1 | 5/2015 | Nakamura et al. |
| 2015/0292068 | A1 | 10/2015 | Teraoka et al. |
| 2015/0376372 | A1 | 12/2015 | Hamada et al. |
| 2016/0002760 | A1 | 1/2016 | Hiraide et al. |
| 2017/0107593 | A1 | 4/2017 | Hamada et al. |
| 2017/0275723 | A1 | 9/2017 | Abe et al. |
| 2017/0321310 | A1 | 11/2017 | Hatano et al. |
| 2019/0106775 | A1 | 4/2019 | Nishida et al. |
| 2019/0177824 | A1 | 6/2019 | Ichikawa et al. |
| 2019/0177825 | A1 | 6/2019 | Yano et al. |
| 2019/0184437 | A1 | 6/2019 | Okabe et al. |
| 2019/0296369 | A1 | 9/2019 | Yano et al. |
| 2019/0305328 | A1 | 10/2019 | Yano et al. |
| 2019/0368001 | A1 | 12/2019 | Kamo et al. |
| 2019/0376157 | A1 | 12/2019 | Kamo et al. |
| 2020/0002779 | A1 | 1/2020 | Yoshino et al. |
| 2020/0080181 | A1 | 3/2020 | Ichikawa et al. |
| 2020/0157646 | A1 | 5/2020 | Eguchi et al. |
| 2020/0216936 | A1 | 7/2020 | Kamo et al. |

FOREIGN PATENT DOCUMENTS

| | | | |
|---|---|---|---|
| CN | 105296860 | A | 2/2016 |
| CN | 105431562 | A | 3/2016 |
| EP | 2857538 | A1 | 4/2015 |
| EP | 2871251 | A1 | 5/2015 |
| EP | 2975151 | A1 | 1/2016 |
| EP | 2980274 | A1 | 2/2016 |
| EP | 2987888 | A1 | 2/2016 |
| EP | 2998415 | A1 | 3/2016 |
| EP | 3176280 | A1 | 6/2017 |
| EP | 3239315 | A1 | 11/2017 |
| JP | 0641695 | A | 2/1994 |
| JP | 1017999 | A | 1/1998 |
| JP | 2001181798 | A * | 7/2001 |
| JP | 2001303202 | A | 10/2001 |
| JP | 2002146484 | A | 5/2002 |
| JP | 2003138348 | A | 5/2003 |
| JP | 2008303445 | A | 12/2008 |
| JP | 2009007663 | A | 1/2009 |
| JP | 2009012070 | A | 1/2009 |
| JP | 2009174040 | A | 8/2009 |
| JP | 2009197293 | A | 9/2009 |
| JP | 2010121208 | A | 6/2010 |
| JP | 2010261074 | A | 11/2010 |
| JP | 2010285683 | A | 12/2010 |
| JP | 2012214880 | A | 11/2012 |
| JP | 2015096648 | A1 | 5/2015 |
| JP | 2016089272 | A | 5/2016 |
| TW | 201406970 | A | 2/2014 |
| TW | 201441385 | A | 11/2014 |
| TW | 201610185 | S | 3/2016 |
| WO | 2015015738 | A1 | 2/2015 |
| WO | 2015147211 | A1 | 10/2015 |
| WO | 2016103565 | A1 | 6/2016 |

OTHER PUBLICATIONS

Taiwan Office Action for Taiwan Application No. 106129738, dated Feb. 27, 2018 with Concise Statement of Relevance of Office Action, 6 pages.

International Search Report and Written Opinion for International Application No. PCT/JP2017/030438, dated Oct. 24, 2017, 5 pages.

Non Final Office Action for U.S. Appl. No. 16/325,577, dated Aug. 7, 2020, 28 pages.

Non Final Office Action for U.S. Appl. No. 16/470,343, dated Aug. 6, 2020, 21 pages.

Non Final Office Action for U.S. Appl. No. 16/615,883, dated Aug. 7, 2020, 41 pages.

Korean Office Action for Korean Application No. 10-2019-7004485, dated Jun. 1, 2020 with Concise Statement of Relevance of Office Action, 6 pages.

Chinese Office Action with Search Report for Chinese Application No. 201780050065.9, dated May 13, 2020, 11 pages.

Japanese Office Action for Japanese Application No. 2018-013699, dated Mar. 19, 2019, with Concise Statement of Relevance of Office Action, 3 pages.

Chinese Office Action for Chinese Application No. 201780050065.9, dated Dec. 10, 2020, with Concise Statement of Relevance of Office Action, 6 pages.

Final Office Action for U.S. Appl. No. 10/512,782, dated May 24, 2010, 4 pages.

Final Office Action for U.S. Appl. No. 10/512,782, dated Aug. 18, 2008, 7 pages.

Final Office Action for U.S. Appl. No. 10/512,782, dated Oct. 15, 2009, 9 pages.

Final Office Action for U.S. Appl. No. 10/512,782, dated Dec. 26, 2007, 6 pages.

Final Office Action for U.S. Appl. No. 13/876,234, dated Dec. 16, 2015, 8 pages.

Final Office Action for U.S. Appl. No. 15/325,145, dated Apr. 15, 2019, 11 pages.

Non Final Office Action for U.S. Appl. No. 10/512,782, dated Mar. 17, 2010, 5 pages.

Non Final Office Action for U.S. Appl. No. 10/512,782, dated May 30, 2007, 7 pages.

Non Final Office Action for U.S. Appl. No. 10/512,782, dated Mar. 13, 2009, 7 pages.

Non Final Office Action for U.S. Appl. No. 13/876,234, dated Apr. 10, 2015, 5 pages.

Non Final Office Action for U.S. Appl. No. 15/325,145, dated Dec. 27, 2018, 10 pages.

Non Final Office Action for U.S. Appl. No. 15/329,856, dated Mar. 26, 2018, 8 pages.

Non Final Office Action for U.S. Appl. No. 15/538,335, dated Apr. 15, 2019, 10 pages.

Non Final Office Action for U.S. Appl. No. 15/538,335, dated Dec. 27, 2018, 10 pages.

Non Final Office Action for U.S. Appl. No. 16/087,468, dated Aug. 4, 2020, 8 pages,.

Korean Office Action for Korean Application No. 10-2019-7004485, dated Oct. 22, 2020 with Concise Statement of Relevance of Office Action, 5 pages.

Chinese Office Action for Chinese Application No. 201780050065.9, dated Mar. 19, 2021 with Concise Statement of Relevance of Office Action, 5 pages.

Final Office Action for U.S. Appl. No. 16/325,577, dated Jan. 22, 2021, 27 pages.

Final Office Action for U.S. Appl. No. 16/480,785, dated Aug. 9, 2021, 14 pages.

Non Final Office Action for U.S. Appl. No. 16/325,577, dated Aug. 2, 2021, 32 pages.

Non Final Office Action for U.S. Appl. No. 16/480,785, dated Jan. 11, 2021, 12 pages.

* cited by examiner

FERRITIC STAINLESS STEEL

CROSS REFERENCE TO RELATED APPLICATIONS

This is the U.S. National Phase application of PCT/JP2017/030438, filed Aug. 25, 2017, which claims priority to Japanese Patent Application No. 2016-171519, filed Sep. 2, 2016, the disclosures of these applications being incorporated herein by reference in their entireties for all purposes.

FIELD OF THE INVENTION

The present invention relates to a ferritic stainless steel that exhibits good brazeability when subjected to high-temperature brazing with a Ni-containing brazing filler metal and which has excellent corrosion resistance.

BACKGROUND OF THE INVENTION

In recent years, from the standpoint of protecting the global environment, there has been a demand for further improvement in the fuel efficiency of automobiles and enhancement in the purification of exhaust gases from automobiles. In response, exhaust heat recovery devices and exhaust gas recirculation devices, such as EGR (Exhaust Gas Recirculation) coolers, are being increasingly employed in automobiles.

An exhaust heat recovery device is a device for improving fuel efficiency by utilizing heat from the engine coolant for the heater and by warming the engine coolant with heat from exhaust gases, thereby reducing the warm-up time when starting the engine. Typically, an exhaust heat recovery device is installed between the catalytic converter and the muffler and includes a heat exchanger section and inlet and outlet pipe sections. The heat exchanger section includes a combination of, for example, pipes, plates, fins, and side plates. Exhaust gases enter the heat exchanger section through the inlet pipe and, in the heat exchanger section, transfer heat to the coolant via heat transfer surfaces, for example, the surfaces of the fins, and are discharged through the outlet pipe. The plates and fins, which are constituents of the heat exchanger section of an exhaust heat recovery device, are bonded and assembled by, in many cases, brazing with a Ni-containing brazing filler metal.

An EGR cooler includes a pipe for collecting exhaust gases from, for example, the exhaust manifold, a pipe for returning exhaust gases to the intake side of the engine, and a heat exchanger for cooling exhaust gases. Specifically, the structure includes a heat exchanger provided in the path for recirculating exhaust gases from the exhaust manifold to the intake side of the engine. The heat exchanger includes both a water flow path and an exhaust gas path. With this structure, high-temperature exhaust gases on the exhaust side are cooled by the heat exchanger, and the cooled exhaust gases are recirculated to the intake side to lower the combustion temperature of the engine. Thus, the structure forms a system for suppressing $NO_x$, which tends to be formed at high temperatures. The heat exchanger section of an EGR cooler is constructed of overlapping thin plates in the form of fins for the purpose of, for example, weight reduction, size reduction, and cost saving. Such thin plates are also bonded and assembled by, in many cases, brazing with a Ni-containing brazing filler metal.

Since the heat exchanger sections of exhaust heat recovery devices and EGR coolers are each bonded and assembled by brazing with a Ni-containing brazing filler metal as described above, the material used in the heat exchanger section needs to have good brazeability for a Ni-containing brazing filler metal. In addition, exhaust gases include small quantity of nitrogen oxides ($NO_x$), sulfur oxides ($SO_x$), and hydrocarbons (HC), and therefore these form highly corrosive acidic condensed water mixed with condensed water of vapor in the heat exchanger. For this reason, the material used in the heat exchanger section also needs to have corrosion resistant at room temperature. In particular, since a brazing heat treatment is performed at a high temperature, it is necessary to prevent formation of a Cr depletion layer due to preferential reaction of Cr at grain boundaries with C and N, which is referred to as sensitization, to ensure corrosion resistance.

For reasons described above, a low-carbon-content austenitic stainless steel, such as SUS 316L and SUS 304L, which is not susceptible to sensitization, is typically used in heat exchanger sections of exhaust heat recovery devices and EGR coolers. However, austenitic stainless steels have problems in that the cost increases because a large amount of Ni is contained and that, because of the high thermal expansion, fatigue properties in usage environments that are hot and subject to restraining forces and strong vibration, for example, in components near the exhaust manifold, are low and thermal fatigue properties at high temperatures are low.

In view of the above, studies have been conducted on using steel other than austenitic stainless steel in heat exchanger sections of exhaust heat recovery devices and EGR coolers. For example, Patent Literature 1 discloses a ferritic stainless steel serving as a material of EGR coolers. In the ferritic stainless steel, components such as Cr, Cu, Al, and Ti are added by using a specific formula while the additive amounts of Al and Ti are limited, to ensure brazeability. In addition, Patent Literature 2 discloses a ferritic stainless steel serving as a component of EGR coolers having a structure joined by Ni brazing. In the ferritic stainless steel, the additive amounts of Al, Ti, and Zr are limited to ensure brazeability.

Furthermore, Patent Literature 3 discloses a ferritic stainless steel. In the ferritic stainless steel material for brazing, the additive amount of Ti is limited to ensure brazeability.

PATENT LITERATURE

PTL 1: Japanese Unexamined Patent Application Publication No. 2010-121208

PTL 2: Japanese Unexamined Patent Application Publication No. 2009-174040

PTL 3: Japanese Unexamined Patent Application Publication No. 2010-285683

SUMMARY OF THE INVENTION

With the technologies disclosed in Patent Literature 1 to 3, however, brazeability may be insufficient, depending on the brazing filler metal used and/or the brazing conditions, for example. In particular, the technologies of the related art cannot be considered to ensure sufficient brazeability with the use of a Ni-containing brazing filler metal at high temperatures while achieving good corrosion resistance, as described above.

Aspects of the present invention were developed in view of the circumstances described above, and an object according to aspects of the present invention is to provide a ferritic stainless steel that has good corrosion resistance and which exhibits good brazeability when subjected to high-temperature brazing with a Ni-containing brazing filler metal.

Here, "good brazeability" is defined as follows. A steel sheet having a Ni-containing brazing filler metal (JIS standards: BNi-5) applied to the surface is heated in a nitrogen carrier gas atmosphere at 1200° C. with 1 Torr for 10 minutes and then cooled to room temperature. Next, good brazeability is indicated when the ratio of the equivalent circular diameter of the brazing filler metal after heating to the equivalent circular diameter of the brazing filler metal before heating (spreading rate of the brazing filler metal) is 150% or greater.

"Excellent corrosion resistance" is defined as follows. A test piece of 20 mm square is cut from a portion free of the brazing filler metal in the steel sheet after brazing treatment with a Ni-containing brazing filler metal. The test piece, except for a measurement surface of 11 mm square, is covered with a sealing material. This test piece is immersed in a 3.5% NaCl solution at 30° C. If the pitting potential, Vc'100, measured in accordance with JIS G 0577 except for the NaCl concentration, is 150 mV or greater (vs SCE), excellent corrosion resistance is indicated.

The present inventors diligently performed studies on the relationship between the component elements of each of various types of stainless steels and brazeability associated with the case in which high-temperature brazing with a Ni-containing brazing filler metal is performed.

As a result, it was found that wettability for a Ni-containing brazing filler metal is improved when the Al content in the stainless steel is limited, an appropriate amount of Ni is contained in the stainless steel, and the Si and Mn content is appropriately limited with respect to the Ni content. Aspects of the present invention were made based on the above findings and with further studies performed.

That is, a summary of aspects of the present invention is as follows.

[1] A ferritic stainless steel having a composition containing, in mass %,
C: 0.003 to 0.020%,
Si: 0.05 to 0.60%,
Mn: 0.05 to 0.50%,
P: 0.04% or less,
S: 0.02% or less,
Cr: 17.0 to 24.0%,
Ni: 0.20 to 0.80%,
Cu: 0.01 to 0.80%,
Mo: 0.01 to 2.50%,
Al: 0.001 to 0.015%,
Nb: 0.25 to 0.60%, and
N: 0.020% or less, with the balance being Fe and incidental impurities, the composition satisfying formula (1) below and formula (2) below, $$Cu+Mo \geq 0.30\% \quad (1)$$

$$4Ni-(Si+Mn) \geq 0\% \quad (2)$$

(wherein Cu and Mo in formula (1) and Ni, Si, and Mn in formula (2) each represent the content (mass %) of the corresponding element).

[2] The ferritic stainless steel according to [1], wherein the composition further contains, in mass %, one or two selected from
Co: 0.01 to 0.50% and
W: 0.01 to 0.50%.

[3] The ferritic stainless steel according to [1] or [2], wherein the composition further contains, in mass %, one or more selected from
Ti: 0.01 to 0.10%,
V: 0.01 to 0.20%,
Zr: 0.01 to 0.10%,
Mg: 0.0005 to 0.0050%,
Ca: 0.0003 to 0.0030%,
B: 0.0003 to 0.0030%,
one or more REMs (rare earth metals): 0.001 to 0.100%,
Sn: 0.001 to 0.100%, and
Sb: 0.001 to 0.100%.

[4] The ferritic stainless steel according to any one of [1] to [3], wherein the ferritic stainless steel is for use in an exhaust heat recovery device including at least one joint formed by brazing or an exhaust gas recirculation device including at least one joint formed by brazing.

Aspects of the present invention make it possible to obtain a ferritic stainless steel that has good corrosion resistance and which exhibits good brazeability when subjected to high-temperature brazing with a Ni-containing brazing filler metal.

DETAILED DESCRIPTION OF EMBODIMENTS OF THE INVENTION

Embodiments of the present invention will be described specifically below.

First, reasons for limiting the chemical composition of the steel to the aforementioned ranges in accordance with aspects of the present invention will be described. In the following description, the unit "%" used to indicate the content of each of the elements in the chemical composition of the steel denotes mass % unless otherwise indicated.

C: 0.003 to 0.020%

Increasing the C content improves strength, whereas decreasing the C content improves workability. Here, C needs to be contained in an amount of 0.003% or greater to achieve sufficient strength. However, if the C content is greater than 0.020%, workability decreases noticeably, and Cr carbides precipitate at grain boundaries, and cause sensitization, with the result that corrosion resistance tends to decrease. Accordingly, the C content is within the range of 0.003 to 0.020%. It is preferable that the C content not be less than 0.004%. Furthermore, the C content is preferably not greater than 0.015% and more preferably not greater than 0.010%.

Si: 0.05 to 0.60%

Si is an element useful as a deoxidizer. The effect is obtained when Si is contained in an amount of 0.05% or greater. If the Si content is greater than 0.60%, however, Si-concentrated products, such as Si oxide and Si nitride, tend to be formed in the surface of the steel sheet during brazing heat treatment, which results in a decrease in brazeability. Accordingly, the Si content is within the range of 0.05 to 0.60%. The Si content is preferably not less than 0.15%, more preferably not less than 0.25%, and even more preferably not less than 0.35%. Furthermore, the Si content is preferably not greater than 0.50% and more preferably not greater than 0.40%.

Mn: 0.05 to 0.50%

Mn has a deoxidizing function, and the effect is obtained when Mn is contained in an amount of 0.05% or greater. However, similarly to Si, if the Mn content is greater than 0.50%, Mn-concentrated products tend to be formed in the surface of the steel sheet during brazing heat treatment, which results in a decrease in brazeability. Accordingly, the Mn content is within the range of 0.05 to 0.50%. The Mn content is preferably not less than 0.10% and more preferably not less than 0.15%. Furthermore, the Mn content is preferably not greater than 0.40%, more preferably not greater than 0.30%, and even more preferably not greater than 0.25%.

P: 0.04% or less

P is an element inevitably contained in steel. An excessive content of P degrades weldability and increases the probability of intergranular corrosion. The tendency becomes pronounced when P is contained in an amount greater than 0.04%. Accordingly, the P content is not greater than 0.04%. It is preferable that the P content not be greater than 0.03%.

S: 0.02% or less

S is an element inevitably contained in steel. Content of S in an amount greater than 0.02% promotes the precipitation of MnS, which degrades corrosion resistance. Accordingly, the S content is not greater than 0.02%. It is preferable that the S content not be greater than 0.01%.

Cr: 17.0 to 24.0%

Cr is an important element for ensuring the corrosion resistance of stainless steel. If the Cr content is less than 17.0%, corrosion resistance after brazing treatment is not sufficient. If Cr is contained in an amount greater than 24.0%, however, a Cr oxide film forms during high-temperature brazing treatment with a Ni-containing brazing filler metal, and as a result, brazeability is deteriorated. Accordingly, the Cr content is within the range of 17.0 to 24.0%. The Cr content is preferably not less than 18.5% and more preferably not less than 19.0%. Furthermore, the Cr content is preferably not greater than 22.0% and more preferably not greater than 20.0%.

Ni: 0.20 to 0.80%

Ni is one of the important elements in accordance with aspects of the present invention. Content of Ni in an amount of 0.20% or greater improves brazeability with respect to a Ni-containing brazing filler metal. The mechanism by which content of Ni improves Ni brazeability is not clear, but it is considered that content of an appropriate amount of Ni in the base metal results in interaction with Ni contained in the brazing filler metal and this improves wettability. If the Ni content is greater than 0.80%, however, susceptibility to stress corrosion cracking increases. Accordingly, the Ni content is within the range of 0.20 to 0.80%. The Ni content is preferably not less than 0.25% and more preferably not less than 0.30%. Furthermore, the Ni content is preferably not greater than 0.70% and more preferably not greater than 0.60%.

Cu 0.01 to 0.80%

Cu is an element that increases corrosion resistance. This effect is obtained when the Cu content is 0.01% or greater. If the Cu content is greater than 0.80%, however, hot workability decreases. Accordingly, the Cu content is within the range of 0.01 to 0.80%. It is preferable that the Cu content not be less than 0.10%. Furthermore, it is preferable that the Cu content not be greater than 0.60%.

Mo: 0.01 to 2.50%

Mo improves corrosion resistance by stabilizing the passivation film of stainless steel. This effect is obtained when the Mo content is 0.01% or greater. However, since Mo is an expensive element, the cost increases. Further, if the Mo content is greater than 2.50%, workability decreases. Accordingly, the Mo content is within the range of 0.01 to 2.50%. It is preferable that the Mo content not be less than 0.0.10%. Furthermore, it is preferable that the Mo content not be greater than 2.00%.

Al: 0.001 to 0.015%

Al is an element useful for deoxidation, and the effect is obtained when Al is contained in an amount of 0.001% or greater. If the Al content is greater than 0.015%, however, Al-concentrated products, such as Al oxide and Al nitride, are formed in the surface of the steel during brazing treatment, which results in decreases in the wetting and spreading properties and the adhesion properties of the brazing filler metal and consequently in difficulties in brazing. Accordingly, the Al content is 0.001 to 0.015% or less. It is preferable that the Al content not be greater than 0.010%. It is more preferable that the Al content not be greater than 0.006%.

Nb: 0.25 to 0.60%

Nb is an element that, by combining with C and N, inhibits a decrease in corrosion resistance due to precipitation of Cr carbonitride (sensitization). These effects are obtained when the Nb content is 0.25% or greater. On the other hand, if the Nb content is greater than 0.60%, weld cracking tends to occur in the weld. Accordingly, the Nb content is within the range of 0.25 to 0.60%. The Nb content is preferably not less than 0.30% and more preferably not less than 0.33%. Furthermore, the Nb content is preferably not greater than 0.50% and more preferably not greater than 0.40%.

N: 0.020% or less

If the N content is greater than 0.020%, corrosion resistance and workability significantly decrease. Accordingly, the N content is not greater than 0.020%. It is preferable that the N content not be greater than 0.015%. It is more preferable that the N content not be greater than 0.010%. The lower limit of the N content is not particularly limited; however, since excessive denitrification increases the cost, it is preferable that the N content not be less than 0.005%.

$$Cu+Mo:0.30\% \text{ or greater} \tag{1}$$

Cu and Mo in formula (1) each represent the content (mass %) of the element. In accordance with aspects of the present invention, the content of Cu and the content of Mo are each predetermined as described above for the purpose of improving corrosion resistance. Further, the present inventors diligently performed studies and found that, if Cu+Mo (sum of the Cu content and the Mo content) is less than 0.30%, the desired corrosion resistance after brazing cannot be achieved. Accordingly, in aspects of the present invention, the Cu content and the Mo content are each within the range described above, and in addition, Cu+Mo is 0.30% or greater. When excellent corrosion resistance is particularly required, Cu+Mo is 1.80% or greater. When Cu+Mo is 1.80% or greater, excellent corrosion resistance is achieved even if the corrosive environment of a heat exchanger is severe, for example, in an environment in which the pH of condensed water is low and/or large quantities of corrosion factors that induce pitting corrosion, such as chloride ions, are contained.

$$4Ni-(Si+Mn):0\% \text{ or greater} \tag{2}$$

Ni, Si, and Mn in formula (2) each represent the content (mass %) of the element. In accordance with aspects of the present invention, the Ni content, the Si content, and the Mn content are predetermined for the purpose of improving brazeability. Further, the present inventors diligently performed studies and found that, if 4Ni−(Si+Mn) (4 times the Ni content minus the Si content and the Mn content) is less than 0%, the desired brazeability cannot be achieved. Accordingly, in aspects of the present invention, the Ni content, the Si content, and the Mn content are each within the ranges described above, and in addition, 4Ni−(Si+Mn) is not less than 0%. It is more preferable that 4Ni−(Si+Mn) not be less than 0.25%. In particular, when the Al content is not greater than 0.006% and 4Ni−(Si+Mn) is not less than 0.25%, even higher brazeability is achieved.

In the above description, fundamental components of the ferritic stainless steel according to aspects of the present invention are described. In the chemical composition according to aspects of the present invention, the components other than those described above are Fe and incidental impurities.

Furthermore, in accordance with aspects of the present invention, the elements described below may be appropriately contained as necessary.

Co: 0.01 to 0.50%

Co is an element that increases corrosion resistance. This effect is obtained when the Co content is 0.01% or greater. If the Co content is greater than 0.50%, however, workability may decrease. Accordingly, when Co is contained, it is preferable that the Co content be within the range of 0.01 to 0.50%. It is more preferable that the Co content not be less than 0.10%. Furthermore, it is more preferable that the Co content not be greater than 0.30%.

W: 0.01 to 0.50%

W is an element that increases corrosion resistance. This effect is obtained when the W content is 0.01% or greater. If the W content is greater than 0.50%, however, workability may decrease. Accordingly, when W is contained, it is preferable that the W content be within the range of 0.01 to 0.50%. It is more preferable that the W content not be less than 0.10%. Furthermore, it is more preferable that the W content not be greater than 0.20%.

Ti: 0.01 to 0.10%

Ti is an element that has an effect of, by combining with C and N contained in steel, preventing sensitization. The effect is obtained when Ti is contained in an amount of 0.01% or greater. On the other hand, Ti is an element that is reactive with oxygen, and, if Ti is contained in an amount greater than 0.10%, a Ti oxide layer may be formed on the surface of the steel during brazing treatment, which may result in a decrease in brazeability. Accordingly, when Ti is contained, it is preferable that the Ti content be within the range of 0.01 to 0.10%. The Ti content is more preferably not greater than 0.05% and even more preferably not greater than 0.03%.

V: 0.01 to 0.20%

Similarly to Ti, V prevents sensitization by combining with C and N contained in steel. Furthermore, V has an effect of, by combining with nitrogen, forming a nitrogen-concentrated layer. These effects are obtained when the V content is 0.01% or greater. On the other hand, if the V content is greater than 0.20%, workability may decrease. Accordingly, when V is contained, it is preferable that the V content be within the range of 0.01 to 0.20%. The V content is more preferably not greater than 0.15% and even more preferably not greater than 0.10%.

Zr: 0.01 to 0.10%

Similarly to Ti and Nb, Zr is an element that inhibits sensitization by combining with C and N contained in steel. This effect is obtained when the Zr content is 0.01% or greater. On the other hand, if the Zr content is greater than 0.10%, workability may decrease. Accordingly, when Zr is contained, it is preferable that the Zr content be within the range of 0.01 to 0.10%. It is more preferable that the Zr content not be less than 0.03%. Furthermore, it is more preferable that the Zr content not be greater than 0.05%.

Mg: 0.0005 to 0.0050%

Mg acts as a deoxidizer. This effect is obtained when the Mg content is 0.0005% or greater. If the Mg content is greater than 0.0050%, however, the toughness of the steel may decrease, which may reduce manufacturability. Accordingly, when Mg is contained, it is preferable that the Mg content be within the range of 0.0005 to 0.0050%. It is more preferable that the Mg content not be greater than 0.0020%.

Ca: 0.0003 to 0.0030%

Ca improves the penetration characteristics of the weld and increases weldability. The effect is obtained when the Ca content is 0.0003% or greater. If the Ca content is greater than 0.0030%, however, Ca may combine with S to form CaS, which may degrade corrosion resistance. Accordingly, when Ca is contained, it is preferable that the Ca content be within the range of 0.0003 to 0.0030%. It is more preferable that the Ca content not be less than 0.0005%. Furthermore, it is more preferable that the Ca content not be greater than 0.0020%.

B: 0.0003 to 0.0030%.

B is an element that improves secondary working embrittlement properties. The effect is obtained when the B content is 0.0003% or greater. If the B content is greater than 0.0030%, however, ductility may decrease as a result of solid solution strengthening. Accordingly, when B is contained, it is preferable that the B content be within the range of 0.0003 to 0.0030%.

REMs (rare earth metals): 0.001 to 0.100%

REMs (rare earth metals, elements having atomic numbers 57 to 71, such as La, Ce, and Nd) are elements effective for deoxidation. The effect is obtained when the REM content is 0.001% or greater. If the REM content is greater than 0.100%, however, hot workability may decrease. Accordingly, when one or more REMs are contained, it is preferable that the REM content be within the range of 0.001 to 0.100%. It is more preferable that the REM content not be less than 0.010%. Furthermore, it is more preferable that the REM content not be greater than 0.050%.

Sn: 0.001 to 0.100%

Sn is an element effective for inhibiting work-induced rough surface. The effect is obtained when the Sn content is 0.001% or greater. If the Sn content is greater than 0.100%, however, hot workability may decrease. Accordingly, when Sn is contained, it is preferable that the Sn content be within the range of 0.001 to 0.100%. It is more preferable that the Sn content not be greater than 0.050%.

Sb: 0.001 to 0.100%

Similarly to Sn, Sb is an element effective for inhibiting work-induced rough surface. The effect is obtained when the Sb content is 0.001% or greater. If the Sb content is greater than 0.100%, however, workability may decrease. Accordingly, when Sb is contained, it is preferable that the Sb content be within the range of 0.001 to 0.100%. It is more preferable that the Sb content not be greater than 0.050%.

Preferable methods for producing the ferritic stainless steel according to aspects of the present invention will now be described.

The production method is not particularly limited provided that the stainless steel sheet has the chemical composition described above.

For example, a stainless steel sheet having the chemical composition described above can be produced as follows. A steel slab having the chemical composition described above is hot rolled into a hot-rolled sheet, and the hot-rolled sheet is subjected to hot-rolled-sheet annealing as necessary. The hot-rolled sheet is then cold rolled into a cold-rolled sheet having a desired sheet thickness, and further, the cold-rolled sheet is subjected to cold-rolled-sheet annealing as necessary.

The conditions for the hot rolling, cold rolling, hot-rolled-sheet annealing, and cold-rolled-sheet annealing are not particularly limited, and common procedures may be employed.

With regard to the steelmaking process for making steel, a preferable process is as follows. Steel melted in, for example, a converter or an electric furnace is subjected to secondary refining using, for example, a VOD method to form a steel containing the essential components described above and components that are optionally added. The molten steel obtained by steelmaking may be cast into steel materials by using a known method. From the standpoint of productivity and quality, it is preferable that the method be a continuous casting method. Subsequently, the steel material is heated, preferably to a temperature of 1050 to 1250° C. and hot rolled into a hot-rolled sheet having a desired sheet thickness. Obviously, the steel material may be hot rolled into a material other than a sheet material. It is preferable that the hot-rolled sheet be subsequently subjected to continuous annealing at a temperature of 900 to 1150° C. as necessary and thereafter be subjected to descaling through pickling, for example, to form a hot-rolled product. As necessary, prior to pickling, shot blasting may be performed to remove scale.

In addition, the hot-rolled and annealed sheet may be subjected to a process such as cold rolling to form a cold-rolled product. In such a case, cold rolling may be performed once, but in view of productivity and the quality required, cold rolling may be performed two or more times with intermediate annealing. The total rolling reduction of the cold rolling, which is performed once or two or more times, is preferably not less than 60% and more preferably not less than 70%. It is preferable that the cold-rolled steel sheet be subsequently subjected to continuous annealing (final annealing), preferably at a temperature of 900 to 1150° C. and more preferably at a temperature of 950 to 1150° C., and then to pickling, to form a cold-rolled product. The continuous annealing may be bright annealing so that pickling is omitted. Furthermore, depending on the intended use, skin pass rolling, for example, may be performed after final annealing to adjust the shape, surface roughness, and quality of the steel sheet.

The ferritic stainless steel according to aspects of the present invention described above is suitable for use in exhaust heat recovery devices and exhaust gas recirculation devices, such as heat exchanger members of EGR coolers, which include at least one joint formed by brazing.

Example

Steels having a chemical composition shown in Table 1 were prepared by steelmaking using a vacuum melting furnace. The steel was heated at 1100 to 1200° C. for one hour and then hot rolled to produce a hot-rolled sheet having a sheet thickness of 4.0 mm. The sheet was subjected to hot-rolled-sheet annealing at 950 to 1100° C. and then to descaling and was thereafter cold rolled to a sheet thickness of 1.0 mm. Final annealing was performed at 950 to 1100° C. to obtain a cold-rolled and annealed sheet, and the surface was polished with sheets of emery paper to #600. The sheet was then subjected to degreasing with acetone to be prepared for tests.

The cold-rolled, annealed, and pickled sheet was subjected to brazing with a Ni-containing brazing filler metal in the following manner, and (1) an evaluation of brazeability was conducted. By using the cold-rolled and annealed sheet after brazing treatment, (2) an evaluation of corrosion resistance was conducted.

(1) Evaluation of Brazeability

A test piece of 50 mm width and 50 mm length was cut from the prepared cold-rolled and annealed sheet. A Ni-containing brazing filler metal (JIS standards: BNi-5), measuring 10 mm in diameter and 1 mm in thickness, was placed on the surface. The test piece was heated in a nitrogen carrier gas atmosphere at 1200° C. with 1 Torr for 10 minutes and then cooled to room temperature, and the equivalent circular diameter of the brazing filler metal on the surface of the test piece was measured.

The spreading rate of brazing filler metal after heating with respect to that of before heating= (equivalent circular diameter of brazing filler metal after test/equivalent circular diameter of brazing filler metal before test)×100(%)

⊙ (pass, very good): 160% or greater
○ (pass): 150% or greater and less than 160%
× (fail): less than 150%

(2) Evaluation of Corrosion Resistance

A test piece of 20 mm square was cut from a portion free of the brazing filler metal in each of the cold-rolled and annealed sheets after brazing treatment. The test piece, except for a measurement surface of 11 mm square, was covered with a sealing material. Subsequently, this test piece was immersed in a 3.5% NaCl solution at 30° C. A corrosion resistance test was conducted in accordance with JIS G 0577, except for the NaCl concentration. The measured pitting potentials, Vc'100, are shown in Table 2. With the use conditions for heat exchanger sections of exhaust heat recovery devices and EGR coolers taken into account, pitting potentials Vc'100 of 150 mV or greater (vs SCE) can be interpreted as indicating that corrosion resistance is excellent.

⊙ (pass, very good): 400 mV or greater (vs SCE)
○ (pass): 150 mV or greater (vs SCE) and less than 400 mV (vs SCE)
× (fail): less than 150 mV (vs SCE)

TABLE 1

| Steel | Chemical composition (mass %) | | | | | | | | | | | | |
|---|---|---|---|---|---|---|---|---|---|---|---|---|---|
| No. | C | Si | Mn | P | S | Cr | Ni | Cu | Mo | Al | Nb | N | Cu + Mo |
| A1 | 0.005 | 0.36 | 0.15 | 0.028 | 0.003 | 19.3 | 0.22 | 0.03 | 0.49 | 0.009 | 0.34 | 0.011 | 0.52 |
| A2 | 0.004 | 0.54 | 0.31 | 0.026 | 0.005 | 19.1 | 0.33 | 0.05 | 1.84 | 0.010 | 0.33 | 0.009 | 1.89 |
| A3 | 0.005 | 0.42 | 0.11 | 0.027 | 0.004 | 19.2 | 0.41 | 0.02 | 2.13 | 0.013 | 0.35 | 0.008 | 2.15 |
| A4 | 0.009 | 0.11 | 0.25 | 0.025 | 0.005 | 23.6 | 0.30 | 0.35 | 0.05 | 0.014 | 0.26 | 0.012 | 0.40 |
| A5 | 0.011 | 0.58 | 0.38 | 0.034 | 0.002 | 19.6 | 0.25 | 0.43 | 0.05 | 0.006 | 0.46 | 0.010 | 0.48 |
| A6 | 0.010 | 0.53 | 0.12 | 0.033 | 0.001 | 19.5 | 0.23 | 0.64 | 0.05 | 0.005 | 0.45 | 0.011 | 0.69 |
| A7 | 0.013 | 0.09 | 0.10 | 0.010 | 0.004 | 19.4 | 0.32 | 0.04 | 1.32 | 0.007 | 0.39 | 0.015 | 1.36 |
| A8 | 0.012 | 0.41 | 0.15 | 0.025 | 0.007 | 17.4 | 0.71 | 0.04 | 0.51 | 0.002 | 0.31 | 0.011 | 0.55 |

TABLE 1-continued

| | | | | | | | | | | | | | |
|---|---|---|---|---|---|---|---|---|---|---|---|---|---|
| A9  | 0.005 | 0.39 | 0.20 | 0.031 | 0.006 | 18.8 | 0.31 | 0.05 | 1.88 | 0.003 | 0.35 | 0.008 | 1.93 |
| A10 | 0.006 | 0.48 | 0.17 | 0.033 | 0.005 | 18.6 | 0.54 | 0.07 | 1.97 | 0.004 | 0.38 | 0.009 | 2.04 |
| A11 | 0.010 | 0.46 | 0.18 | 0.030 | 0.005 | 19.2 | 0.35 | 0.54 | 0.06 | 0.003 | 0.43 | 0.009 | 0.60 |
| A12 | 0.005 | 0.36 | 0.16 | 0.031 | 0.004 | 18.8 | 0.22 | 0.49 | 0.05 | 0.004 | 0.53 | 0.011 | 0.54 |
| A13 | 0.008 | 0.44 | 0.21 | 0.027 | 0.005 | 19.4 | 0.47 | 0.45 | 1.68 | 0.002 | 0.34 | 0.009 | 2.13 |
| B1  | 0.003 | <u>0.65</u> | 0.15 | 0.025 | 0.004 | 19.4 | 0.35 | 0.05 | 1.88 | 0.009 | 0.36 | 0.007 | 1.93 |
| B2  | 0.005 | 0.38 | <u>0.52</u> | 0.028 | 0.006 | 19.2 | 0.39 | 0.05 | 1.84 | 0.011 | 0.34 | 0.008 | 1.89 |
| B3  | 0.006 | 0.15 | 0.21 | 0.027 | 0.005 | 19.5 | <u>0.18</u> | 0.05 | 1.55 | 0.008 | 0.32 | 0.009 | 1.60 |
| B4  | 0.004 | 0.43 | 0.22 | 0.026 | 0.005 | 19.3 | 0.38 | 0.05 | 1.84 | <u>0.018</u> | 0.33 | 0.009 | 1.89 |
| B5  | 0.006 | 0.45 | 0.13 | 0.027 | 0.004 | 19.5 | 0.44 | 0.04 | 1.23 | 0.010 | 0.34 | 0.009 | 1.27 |
| B6  | 0.006 | 0.44 | 0.17 | 0.027 | 0.003 | 18.3 | 0.33 | 0.12 | 0.14 | 0.013 | 0.30 | 0.007 | <u>0.26</u> |
| B7  | 0.004 | 0.54 | 0.44 | 0.026 | 0.005 | 19.1 | 0.24 | 0.05 | 1.83 | 0.014 | 0.33 | 0.009 | 1.88 |
| B8  | 0.005 | 0.57 | 0.48 | 0.031 | 0.003 | 18.7 | 0.22 | 0.08 | 1.05 | 0.008 | 0.35 | 0.012 | 1.13 |

| | Chemical composition (mass %) | | |
|---|---|---|---|
| Steel No. | 4Ni − (Si + Mn) | Others | Notes |
| A1  | 0.37 | — | Conforming steel |
| A2  | 0.47 | Co: 0.03 | Conforming steel |
| A3  | 1.11 | — | Conforming steel |
| A4  | 0.84 | Ti: 0.03, Mg: 0.0006, Ca: 0.0004 | Conforming steel |
| A5  | 0.04 | Co: 0.04, V: 0.03, Zr: 0.08, B: 0.0003 | Conforming steel |
| A6  | 0.27 | — | Conforming steel |
| A7  | 1.09 | V: 0.02, Sn: 0.01, Sb: 0.02, REM: 0.002 | Conforming steel |
| A8  | 2.28 | W: 0.13 | Conforming steel |
| A9  | 0.65 | — | Conforming steel |
| A10 | 1.51 | Ti: 0.01, V: 0.08, Ca: 0.0006 | Conforming steel |
| A11 | 0.76 | — | Conforming steel |
| A12 | 0.36 | W: 0.09, Mg: 0.0007, REM: 0.05, Sb: 0.01 | Conforming steel |
| A13 | 1.23 | Co: 0.05, Zr: 0.03, B: 0.0005, Sn: 0.01 | Conforming steel |
| B1  | 0.60 | — | Comparative steel |
| B2  | 0.66 | — | Comparative steel |
| B3  | 0.36 | — | Comparative steel |
| B4  | 0.87 | — | Comparative steel |
| B5  | 1.18 | <u>Ti: 0.13</u> | Comparative steel |
| B6  | 0.71 | — | Comparative steel |
| B7  | <u>−0.02</u> | — | Comparative steel |
| B8  | <u>−0.17</u> | — | Comparative steel |

Balance components of the chemical composition are Fe and incidental impurities.
Underline indicates value is outside of range of present invention.

TABLE 2

| Steel | | Evaluation result | | |
|---|---|---|---|---|
| No. | No. | Brazeability | Corrosion resistance | Notes |
| 1  | A1  | ◯ | ◯ | Invention example |
| 2  | A2  | ◯ | ⊙ | Invention example |
| 3  | A3  | ◯ | ⊙ | Invention example |
| 4  | A4  | ◯ | ◯ | Invention example |
| 5  | A5  | ◯ | ◯ | Invention example |
| 6  | A6  | ⊙ | ◯ | Invention example |
| 7  | A7  | ◯ | ◯ | Invention example |
| 8  | A8  | ⊙ | ◯ | Invention example |
| 9  | B1  | X | ⊙ | Comparative example |
| 10 | B2  | X | ⊙ | Comparative example |
| 11 | B3  | X | ◯ | Comparative example |
| 12 | B4  | X | ⊙ | Comparative example |
| 13 | B5  | X | ◯ | Comparative example |
| 14 | B6  | ◯ | X | Comparative example |
| 15 | B7  | X | ⊙ | Comparative example |
| 16 | A9  | ⊙ | ◯ | Invention example |
| 17 | A10 | ⊙ | ⊙ | Invention example |
| 18 | A11 | ⊙ | ◯ | Invention example |
| 19 | A12 | ⊙ | ◯ | Invention example |
| 20 | A13 | ⊙ | ⊙ | Invention example |
| 21 | B8  | X | ◯ | Comparative example |

Table 2 indicates that all of Invention Examples Nos. 1 to 8 and Nos. 16 to 20 had good corrosion resistance and brazeability. In particular, Nos. 6 and 8 and Nos. 16 to 20, in each of which the Al content was not greater than 0.006% and 4Ni−(Si+Mn)≥0.25%, exhibited excellent brazeability.

In contrast, in Comparative Examples Nos. 9 to 15 and 21, since in each of which the chemical composition was outside of the appropriate range, good brazeability and/or corrosion resistance were not achieved.

More specifically, in Comparative Example No. 9 (Steel No. B1), the Si content was higher than the upper limit of the present invention, and as a result, good brazeability was not achieved.

In Comparative Example No. 10 (Steel No. B2), the Mn content was higher than the upper limit of the present invention, and as a result, good brazeability was not achieved.

In Comparative Example No. 11 (Steel No. B3), the Ni content was lower than the lower limit of the present invention, and as a result, good brazeability was not achieved.

In Comparative Example No. 12 (Steel No. B4), the Al content was higher than the upper limit of the present invention, and as a result, good brazeability was not achieved.

In Comparative Example No. 13 (Steel No. B5), the Ti content was higher than the upper limit of the present invention, and as a result, good brazeability was not achieved.

In Comparative Example No. 14 (Steel No. B6), Cu+Mo (sum of the Cu content and the Mo content) was lower than the lower limit of the present invention, and as a result, good corrosion resistance was not achieved.

In Comparative Example No. 15 (Steel No. B7) and Comparative Example No. 21 (Steel No. B8), 4Ni−(Si+Mn) (4 times the Ni content minus the Si content and the Mn content) was lower than the lower limit of the present invention, and as a result, good brazeability was not achieved.

INDUSTRIAL APPLICABILITY

In accordance with aspects of the present invention, a ferritic stainless steel is obtained which is suitable for use in exhaust heat recovery devices and exhaust gas recirculation devices, such as heat exchanger members of EGR coolers, which are assembled by brazing. Aspects of the present invention are therefore very useful in the industry.

The invention claimed is:

1. A ferritic stainless steel comprising a composition containing, in mass %,
C: 0.003 to 0.020%,
Si: 0.05 to 0.60%,
Mn: 0.05 to 0.50%,
P: 0.04% or less,
S: 0.02% or less,
Cr: 17.0 to 24.0%,
Ni: 0.20 to 0.80%,
Cu: 0.01 to 0.80%,
Mo: 1.32 to 2.50%,
Al: 0.001 to 0.015%,
Nb: 0.25 to 0.60%, and
N: 0.020% or less, with a balance of Fe and incidental impurities, the composition excluding Sn and W and satisfying formula (1) below and formula (2) below, $$Cu+Mo \geq 0.30\% \quad (1)$$

$$4Ni-(Si+Mn) \geq 0\% \quad (2)$$

wherein Cu and Mo in formula (1) and Ni, Si, and Mn in formula (2) each represent a content, in mass %, of a corresponding element,
wherein when a steel sheet formed from the ferritic stainless steel has a Ni-containing brazing filler metal applied to a surface that is heated in a nitrogen carrier gas atmosphere at 1200° C. with 1 Torr for 10 minutes and then cooled to room temperature, a ratio of an equivalent circular diameter of the brazing filler metal after the heating to an equivalent circular diameter of the brazing filler metal before the heating is 150% or greater, and
wherein when a test piece of 20 mm square is cut from a portion of the steel sheet formed from the ferritic stainless steel free of the brazing filler metal after brazing, and when the test piece, except for a measurement surface of 11 mm square, is covered with a sealing material, and this covered test piece is immersed in a 3.5% NaCl solution at 30° C., a pitting potential is 150 mV or greater.

2. The ferritic stainless steel according to claim 1, wherein the composition further contains, in mass %, Co: 0.01 to 0.50%.

3. The ferritic stainless steel according to claim 1, wherein the composition further contains, in mass %, one or more selected from
Ti: 0.01 to 0.10%,
V: 0.01 to 0.20%,
Zr: 0.01 to 0.10%,
Mg: 0.0005 to 0.0050%,
Ca: 0.0003 to 0.0030%,
B: 0.0003 to 0.0030%,
one or more REMs (rare earth metals): 0.001 to 0.100%, and
Sb: 0.001 to 0.100%.

4. The ferritic stainless steel according to claim 1, wherein the ferritic stainless steel is for use in an exhaust heat recovery device including at least one joint formed by brazing or an exhaust gas recirculation device including at least one joint formed by brazing.

5. The ferritic stainless steel according to claim 2, wherein the composition further contains, in mass %, one or more selected from
Ti: 0.01 to 0.10%,
V: 0.01 to 0.20%,
Zr: 0.01 to 0.10%,
Mg: 0.0005 to 0.0050%,
Ca: 0.0003 to 0.0030%,
B: 0.0003 to 0.0030%,
one or more REMs (rare earth metals): 0.001 to 0.100%, and
Sb: 0.001 to 0.100%.

6. The ferritic stainless steel according to claim 2, wherein the ferritic stainless steel is for use in an exhaust heat recovery device including at least one joint formed by brazing or an exhaust gas recirculation device including at least one joint formed by brazing.

7. The ferritic stainless steel according to claim 3, wherein the ferritic stainless steel is for use in an exhaust heat recovery device including at least one joint formed by brazing or an exhaust gas recirculation device including at least one joint formed by brazing.

8. The ferritic stainless steel according to claim 5, wherein the ferritic stainless steel is for use in an exhaust heat recovery device including at least one joint formed by brazing or an exhaust gas recirculation device including at least one joint formed by brazing.

9. The ferritic stainless steel according to claim 1, wherein the composition contains, in mass %, Al: 0.001 to 0.007%.

10. A ferritic stainless steel comprising a composition consisting of, in mass %,
C: 0.003 to 0.020%,
Si: 0.05 to 0.60%,
Mn: 0.05 to 0.50%,
P: 0.04% or less,
S: 0.02% or less,
Cr: 17.0 to 24.0%,
Ni: 0.20 to 0.80%,
Cu: 0.01 to 0.80%,
Mo: 1.32 to 2.50%,
Al: 0.001 to 0.015%,
Nb: 0.25 to 0.60%,
N: 0.020% or less,
optionally one or more of:
Co: 0.01 to 0.50%,
Ti: 0.01 to 0.10%,
V: 0.01 to 0.20%,
Zr: 0.01 to 0.10%, Mg: 0.0005 to 0.0050%,
Ca: 0.0003 to 0.0030%,
B: 0.0003 to 0.0030%,
one or more REMs (rare earth metals): 0.001 to 0.100% and,
Sb: 0.001 to 0.100%,
with the balance of Fe and incidental impurities, satisfying formula (1) below and formula (2) below, $$Cu+Mo \geq 0.30\% \tag{1}$$

$$4Ni-(Si+Mn) \geq 0\% \tag{2}$$

wherein Cu and Mo in formula (1) and Ni, Si, and Mn in formula (2) each represent a content, in mass %, of a corresponding element,
wherein when a steel sheet formed from the ferritic stainless steel has a Ni-containing brazing filler metal applied to a surface that is heated in a nitrogen carrier gas atmosphere at 1200° C. with 1 Torr for 10 minutes and then cooled to room temperature, a ratio of an equivalent circular diameter of the brazing filler metal after the heating to an equivalent circular diameter of the brazing filler metal before the heating is 150% or greater, and
wherein when a test piece of 20 mm square is cut from a portion of the steel sheet formed from the ferritic stainless steel free of the brazing filler metal after brazing, and when the test piece, except for a measurement surface of 11 mm square, is covered with a sealing material, and this covered test piece is immersed in a 3.5% NaCl solution at 30° C., a pitting potential is 150 mV or greater.

11. The ferritic stainless steel according to claim 10, wherein the composition contains, in mass %, Al: 0.001 to 0.007%.

12. The ferritic stainless steel according to claim 10, wherein the ferritic stainless steel is for use in an exhaust heat recovery device including at least one joint formed by brazing or an exhaust gas recirculation device including at least one joint formed by brazing.

13. The ferritic stainless steel according to claim 11, wherein the ferritic stainless steel is for use in an exhaust heat recovery device including at least one joint formed by brazing or an exhaust gas recirculation device including at least one joint formed by brazing.

14. A ferritic stainless steel comprising a composition containing, in mass %,
C: 0.003 to 0.020%,
Si: 0.05 to 0.60%,
Mn: 0.05 to 0.50%,
P: 0.04% or less,
S: 0.02% or less,
Cr: 17.0 to 24.0%,
Ni: 0.20 to 0.80%,
Cu: 0.01 to 0.80%,
Mo: 1.32 to 2.50%,
Al: 0.001 to 0.015%,
Nb: 0.25 to 0.60%,
W: 0.01 to 0.50%, and
N: 0.020% or less, with a balance of Fe and incidental impurities, the composition excluding Sn and satisfying formula (1) below and formula (2) below, $$Cu+Mo \geq 0.30\% \tag{1}$$

$$4Ni-(Si+Mn) \geq 0\% \tag{2}$$

wherein Cu and Mo in formula (1) and Ni, Si, and Mn in formula (2) each represent a content, in mass %, of a corresponding element,
wherein when a steel sheet formed from the ferritic stainless steel has a Ni-containing brazing filler metal applied to a surface that is heated in a nitrogen carrier gas atmosphere at 1200° C. with 1 Torr for 10 minutes and then cooled to room temperature, a ratio of an equivalent circular diameter of the brazing filler metal after the heating to an equivalent circular diameter of the brazing filler metal before the heating is 150% or greater, and
wherein when a test piece of 20 mm square is cut from a portion of the steel sheet formed from the ferritic stainless steel free of the brazing filler metal after brazing, and when the test piece, except for a measurement surface of 11 mm square, is covered with a sealing material, and this covered test piece is immersed in a 3.5% NaCl solution at 30° C., a pitting potential is 150 mV or greater.

15. The ferritic stainless steel according to claim 14, wherein the composition further contains, in mass %, Co: 0.01 to 0.50%.

16. The ferritic stainless steel according to claim 14, wherein the composition further contains, in mass %, one or more selected from
Ti: 0.01 to 0.10%,
V: 0.01 to 0.20%,
Zr: 0.01 to 0.10%,
Mg: 0.0005 to 0.0050%,
Ca: 0.0003 to 0.0030%,
B: 0.0003 to 0.0030%,
one or more REMs (rare earth metals): 0.001 to 0.100%, and
Sb: 0.001 to 0.100%.

17. The ferritic stainless steel according to claim 14, wherein the ferritic stainless steel is for use in an exhaust heat recovery device including at least one joint formed by brazing or an exhaust gas recirculation device including at least one joint formed by brazing.

18. The ferritic stainless steel according to claim 15, wherein the composition further contains, in mass %, one or more selected from
Ti: 0.01 to 0.10%,
V: 0.01 to 0.20%,
Zr: 0.01 to 0.10%,
Mg: 0.0005 to 0.0050%,
Ca: 0.0003 to 0.0030%,
B: 0.0003 to 0.0030%,
one or more REMs (rare earth metals): 0.001 to 0.100%, and
Sb: 0.001 to 0.100%.

19. The ferritic stainless steel according to claim 15, wherein the ferritic stainless steel is for use in an exhaust heat recovery device including at least one joint formed by brazing or an exhaust gas recirculation device including at least one joint formed by brazing.

20. The ferritic stainless steel according to claim 16, wherein the ferritic stainless steel is for use in an exhaust heat recovery device including at least one joint formed by brazing or an exhaust gas recirculation device including at least one joint formed by brazing.

21. The ferritic stainless steel according to claim 18, wherein the ferritic stainless steel is for use in an exhaust heat recovery device including at least one joint formed by brazing or an exhaust gas recirculation device including at least one joint formed by brazing.

22. The ferritic stainless steel according to claim 14, wherein the composition contains, in mass %, Al: 0.001 to 0.007%.

* * * * *